April 26, 1932.    P. E. MATTHEWS    1,855,643

SEMICENTRIFUGAL CLUTCH

Filed Dec. 19, 1929

INVENTOR
Philip E. Matthews,
BY
Redding, Greeley, O'Shea & Campbell
HIS ATTORNEYS Patented Apr. 26, 1932

1,855,643

UNITED STATES PATENT OFFICE

PHILIP E. MATTHEWS, OF PLAINFIELD, NEW JERSEY, ASSIGNOR TO INTERNATIONAL MOTOR COMPANY, OF NEW YORK, N. Y., A CORPORATION OF DELAWARE

SEMICENTRIFUGAL CLUTCH

Application filed December 19, 1929. Serial No. 415,231.

The present invention relates to clutches and embodies, more specifically, an improved clutch which functions automatically with changes in speed of a vehicle to increase the pressure between the friction plates thereof.

The desirability of providing a clutch construction which automatically increases the friction between the plates thereof will be readily apparent since such operation affords a convenient means of controlling the application of power to the final drives of vehicles. In this manner, light clutch springs may be used to permit a soft engagement of the clutch discs, such construction automatically increasing its clutching capacity at higher engine speeds to eliminate completely clutch slippage at such high speeds.

An object of the invention, accordingly, is to provide a clutch which is so constructed that its clutching capacity is automatically increased, thus eliminating detrimental slippage under certain conditions.

A further object of the invention is to provide a clutch of the above character which varies its clutching capacity automatically in accordance with changes in speed of the motor vehicle.

Further objects, not specifically enumerated above, will be apparent as the invention is described in greater detail in connection with the accompanying drawings, wherein.

Referring to the above drawings, $a$ designates a driving shaft, such as an engine crank shaft to which a clutch housing $b$ is secured in a well known manner. A driven shaft $c$ journaled at $a'$ in the shaft $a$, is provided with friction disc $c'$, these discs cooperating with a friction plate $b'$ and face $b^2$ formed on the housing $b$. The friction plate is preferably urged against the discs $c'$ by means of springs $d$, the movement of plate $b'$ being controlled by structure which is well known in the art.

The manual control of the plate $b'$, for example, may be effected by a sleeve $e$, mounted upon a stationary element $e'$, and carrying a thrust collar $e^2$. The sleeve $e$ may be moved axially by means of a manually operated clutch yoke $f$ which engages fingers $e^3$ on the sleeve, a spring $e^4$ normally urging the sleeve to the right, as viewed in Figure 1. The thrust collar $e^2$ bears against an arm $g$ which is pivoted upon suitable brackets $g'$, mounted within the housing $b$. Arms $g$ are pivoted to the plates $b'$ at $g^2$ and are formed with centrifugal arms $g^3$ which carry weights $g^4$. Suitable springs $g^5$ normally urge the arms $g^3$ and weights $g^4$ inwardly and resist the movement thereof due to centrifugal force when the clutch housing rotates.

It will be seen that the weighted arms $g^3$ move outwardly under centrifugal force in proportion to the speed of the vehicle, thus increasing the clutching capacity of the construction in proportion to the speed thereof.

Figure 1:
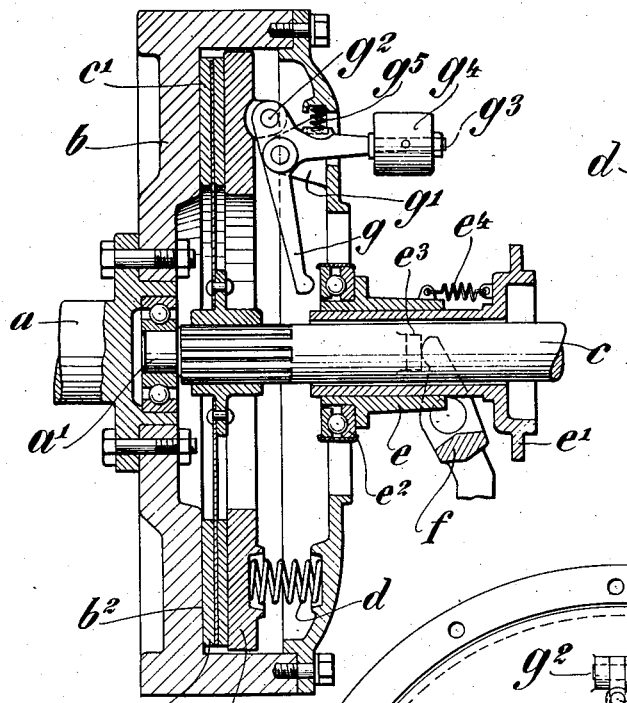
Figure 1 is a view in section, taken on a plane passing through the axis of a clutch constructed in accordance with the present invention.
Figure 3:
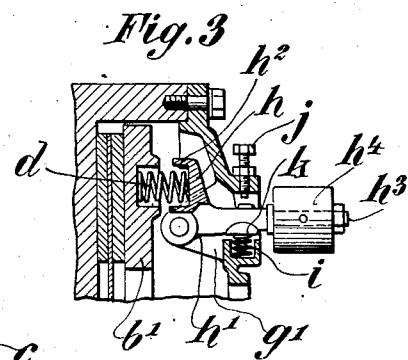
Figure 3 is a segmental view, similar to Figure 1, showing a modified construction.
Figure 2:
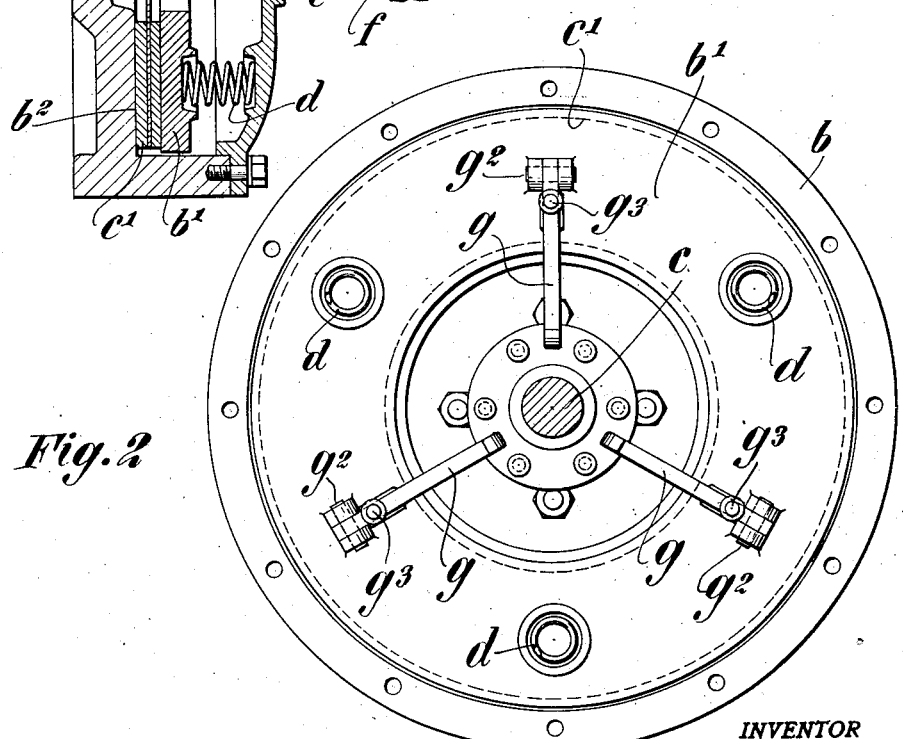
Figure 2 is a view in front elevation showing the clutch construction of Figure 1.

With reference to Figure 3, a modified construction is shown in which the clutch plate $b'$ is urged against the friction discs by means of springs $d$, similar in construction to the springs shown in Figure 1, these springs engaging arms $h$ of a bell crank lever $h'$, such arms being formed with seats $h^2$ against which springs $d$ engage. The bell crank levers $h$ are mounted upon brackets $g'$, as in the construction shown in Figure 1, and outwardly extending arms $h^3$ carry weights $h^4$ in a manner similar to the corresponding parts $g^3$ and $g^4$ in Figure 1. Springs $i$ resist the movement of arms $h^3$ under the influence of springs $d$ and aid the movement of arms $h^3$ under influence of centrifugal force. A set screw $j$ may be provided to limit the movement of arms $h^3$. The spring $i$ acts as a damper and relieves the impact against a metallic stop $k$ on the lever $h^3$. It will be apparent that this construction affords a ready means of relieving the pressure on the friction plates by adjusting screws $j$ inwardly. The operation of the foregoing device will be seen to be similar to that of standard forms of clutches now available and in addition, the weights $g^4$ or $b^4$, under the action of centrifugal force, due to rotation tend to force the clutch elements in more intimate contact. This insures a positive drive without slipping under all conditions, and at the same time enables the manual operation of the clutch to be effected in the usual manner.

While the invention has been described with specific reference to the accompanying drawings, it is not to be limited, save as defined in the appended claim.

I claim as my invention:

A device of the character described comprising a clutch having relatively rotatable friction elements, means to engage the elements to effect a drive therethrough, an arm pivoted to one of the clutch members, said arm being actuated by the engaging means, a weight carrying arm on the first arm, a weight on the last named arm, and a spring resisting movement of the weight under centrifugal force.

This specification signed this 16 day of Dec. A. D. 1929.

PHILIP E. MATTHEWS.